Feb. 25, 1969  N. FUHRMAN ET AL  3,429,699
HIGH LOADED UO$_2$-COLUMBIUM CERMETS
Filed July 24, 1967
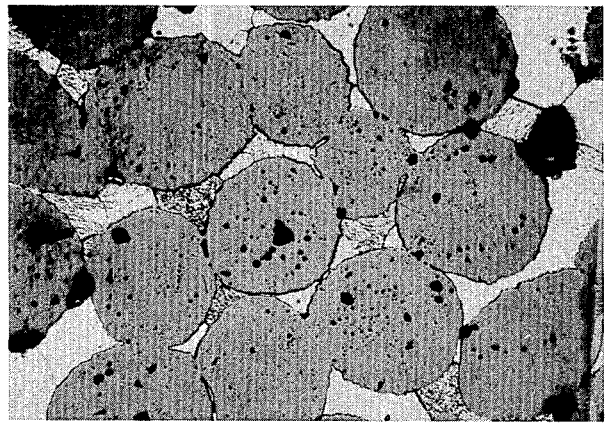
INVENTORS.
NATHAN FUHRMAN
EMANUEL GORDON
ROBERT B. HOLDEN United States Patent Office
3,429,699
Patented Feb. 25, 1969

3,429,699
HIGH LOADED UO₂-COLUMBIUM CERMETS
Nathan Fuhrman, Shrub Oak, N.Y., Emanuel Gordon, New Haven, Conn., and Robert B. Holden, Pleasantville, N.Y., assignors to the United States of America as represented by the United States Atomic Energy Commission
Filed July 24, 1967, Ser. No. 658,306
U.S. Cl. 75—206     3 Claims
Int. Cl. B22f 3/16

ABSTRACT OF THE DISCLOSURE

A process for producing improved $UO_2$-columbium cermets having ceramic phase loadings of over 70 volume percent, comprising coating $UO_2$ spheres with a wax coating then with a mixture of powdered columbium and carbon, forming a compact, dewaxing the compact, and heat sintering the compact, wherein the carbon is used to remove oxygen impurities and to increase the theoretical density of the cermet.

CROSS-REFERENCE TO RELATED APPLICATIONS

This application is related to U.S. patent application Ser. No. 656,986, entitled "High Loaded $UO_2$-Columbium Cermets," Gordon et al. filed simultaneously herewith now U.S. Patent No. 3,419,387, issued Dec. 31, 1968.

BACKGROUND OF THE INVENTION

The invention described herein was made in the course of, or under a contract with the U.S. Atomic Energy Commission.

In U.S. patent application Ser. No. 656,986, the inventors have disclosed both the need for and a method of preparing $UO_2$ cermets having $UO_2$ loadings greater than 70 volume percent. The cermets prepared in that application are an improvement over those produced by prior art techniques and are usable as fuel in many fast reactor applications. However, certain fast reactor applications require a $UO_2$ cermet fuel which is more ductile and has a higher density than that produced by the process disclosed in the cross-referenced application.

SUMMARY OF THE INVENTION

We have discovered an improved method for producing uranium dioxide columbium cermets having increased ductility and $UO_2$ loadings of greater than 70 volume percent $UO_2$, with the balance consisting of columbium comprising applying a uniform wax coating to the surface of $UO_2$ spheres containing oxygen as an impurity, the $UO_2$ spheres having a density ranging from about 55 percent to about 74 percent of theoretical and a diameter ranging from about 80 microns to about 250 microns, applying a uniform coating of a mixture containing from about 19.5 to about 33.5 weight percent particulate columbium based on the weight of the $UO_2$ spheres, the columbium having oxygen contained therein as an impurity, and particulate carbon in an amount which is at least stoichiometrically equal to the amount of oxygen impurity contained in and as excess oxygen in the $UO_2$ spheres, and the particulate columbium, the particulate size of said columbium and said carbon being less than 10 microns, isostatically applying a pressure of greater than 20 tons per square inch to the columbium-carbon coated spheres to form a compact of the spheres, heating the compact under an inert atmosphere such as a vacuum to a temperature of less than 900° C. to dewax the compact, thereafter heating the dewaxed compact under a vacuum, to 1700° C. and holding at this temperature for one hour during which oxygen impurities are removed by reaction with the carbon black in the compact, then further heating under an inert atmosphere at temperatures ranging from about 2100° C. to about 2300° C. to sinter the compact. It is an object of this invention to produce $UO_2$ cermets having increased ductility and increased $UO_2$ theoretical density.

BRIEF DESCRIPTION OF THE FIGURE

The figure is a photomicrograph of a cross section of a cermet made in accordance with the practice of this invention.

DESCRIPTION OF THE PREFERRED EMBODIMENT

When $UO_2$ spheres having a density of over 74 percent of theoretical are employed in the practice of our invention, one cannot obtain the desired high density cermet body. $UO_2$ spheres having a density of less than 55 percent of theoretical are too fragile to process. In the preferred embodiment of our invention, we use $UO_2$ spheres having a density ranging from 60 percent to 70 percent of theoretical. The $UO_2$ spheres found usable in our invention can readily be prepared by techniques well known to those skilled in the art and they are commercially available. In the preferred embodiment of our invention we employ a sharp fraction of $UO_2$ spheres having a narrow size range of from 100 to 150 microns.

Commercially available $UO_2$ spheres contain oxygen in excess of the stoichiometry. This oxygen excess appears to be a by-product of the generally accepted and conventional methods of preparing $UO_2$ spheres. When such spheres containing the excess oxygen are employed to make cermets as is done in the process disclosed in our cross-referenced and related application, the excess oxygen found therein contributes directly to hardening the columbium matrix produced in the cermet. Oxygen impurity in the columbium powder raw material also contributes to a matrix hardening. For this reason we have added carbon to the columbium to remove substantially all of the oxygen impurity introduced by the $UO_2$ spheres and the columbium. Care must be taken during the practice of our invention to prevent the introduction of further oxygen impurities.

The wax is applied to the $UO_2$ spheres merely to provide a removable adhesive to allow the mixture of particulate columbium and carbon adhere to the $UO_2$ spheres. The amount of wax is not critical, since the wax is removed from the product in a subsequent step of the process. In general we employ an amount of wax ranging from about 0.15 to about 3.0 weight percent based on the total weight of the $UO_2$ spheres employed. The amount of wax will of course be directly related to the degree of porosity of the $UO_2$ spheres. To apply the wax to the spheres all that is necessary is to dissolve the wax in the solvent, such as benzene, and to mix the $UO_2$ spheres in the solution, thereafter the benzene is removed from the mixture by evaporation, thus producing the wax coated spheres.

The wax-coated particles are then blended (tumbled) with the mixture of particulate columbium and carbon to coat the mixture on to the spheres. This method of coating is well known to those skilled in the art as the "sticky ball method of coating."

The amount of columbium to be coated on to the spheres can range from about 19.5 to about 33.5 weight percent columbium based on the weight of the $UO_2$ contained in the spheres, corresponding to 80 v/o and 70 v/o $UO_2$ loadings, respectively. Commercially available particulate columbium can be used in the practice of our invention. However, care should be used in selecting columbium having a low amount of oxygen impurity.

The amount of particulate carbon to be employed should be at least an amount which is stoichiometrically equivalent to the amount of oxygen impurity found in the $UO_2$ spheres and columbium taking into account the amount of carbon residue derived from the wax after the dewaxing step. More carbon can be employed e.g. twice the stoichiometric amount of the oxygen impurity. The carbon can be in the form of any pure carbon material and in the preferred embodiment of our invention we employ commercially available carbon black.

The columbium-carbon coated $UO_2$ spheres can then be shaped into a cermet fuel element by subjecting them in a mold to an isostatic pressure of greater than 20 tons per square inch to form a compact. The pressures employed permit the formation of a strong green compact and aid in the elimination of void spaces in the pressed structure, thus assisting in achieving the high density of the final product.

The use of the wax binder necessitates a furnace operation for its removal from the green compacts prior to sintering. This is easily accomplished by heating the wax containing compact under an inert atmosphere such as argon, or a vacuum, to a temperature of less than 900° C. until the wax is removed. The temperature pressure conditions should be sufficient to remove the wax.

The dewaxed compacts are then heated under vacuum to 1700° C. and held at this temperature. The compacts are then sintered by heating to a temperature ranging from about 2100° C. to about 2300° C. under an inert atmosphere, e.g. helium. In the preferred embodiment of our invention, we employ a temperature of about 2200° C. during the sintering operation to enable the carbon which has been introduced into the compact to react with substantially all of the oxygen impurity to form carbon monoxide, thus removing the impurity from the compact.

The sintered compacts can be ground to the desired shape. They can be inserted into a sheath such as columbium to produce fuel pins which may be either gas bonded or metallurgically bonded. This high $UO_2$ loaded cermet fabrication process can be employed to produce nuclear fuel elements of any desired shape.

EXAMPLE I 26.57 grams of porous spheroidal $UO_2$ particles having an O/U ratio of 2.01, a particle size ranging from 105 microns to 147 microns and a theoretical density of 61.4 percent were mixed with a solution composed of 1.05 grams of paraffin and 7 ml. of benzene. The benzene was evaporated from the mixture and the wax coated $UO_2$ spheres were passed through a 60 mesh screen (U.S. Standard) to separate some clumps of particles which had formed.

The wax coated spheres were blended (tumbled) in a container with a mixture of 5.21 grams of particulate columbium, which had 5500 p.p.m. oxygen impurity and a particle size of less than 10 microns, and 0.026 gram of carbon black until substantially all of the columbium powder and carbon black was uniformly coated onto the wax coated $UO_2$ spheres.

The columbium coated spheres were then preformed into a cylindrical compact having a diameter of 0.449 inch and a length of 2.6045 inches, by subjecting them to a die pressing at a pressure of about 2 tons per square inch. Thereafter, the preformed compact was isostatically pressed, in a rubber mold, with an isostatic pressure of 30 tons per square inch, to produce a cylinder having a diameter of 0.391 inch, length of 2.40 inches and a weight of 32.7 grams.

Thereafter the green compact was dewaxed by heating it to a temperature of 500° C. in a high vacuum ($<10^{-4}$ mm. Hg) in a low leak rate apparatus until the wax was removed from the compact. The dewaxed compact was then heated under the vacuum to 1700° C. and held at that temperature for one hour during which oxygen impurities are removed by reaction with the carbon black residue in the compact. A helium atmosphere was then introduced into the system and the compact was heat sintered at 2200° C. for three hours. The sintered compact was cylindrically shaped having a diameter of 0.346 inch, a length of 2.122 inches, a weight of 31.41 grams, a density of 9.88 grams/cm.$^3$, equivalent to 94.5% of theoretical. The photomicrograph is of the cermet prepared in this example.

The density of the cermet produced in this example is at least two to four percent greater than that of cermets produced by a similar process which do not have the carbon addition to the starting mixture.

We claim:
1. An improved method for producing uranium dioxide-columbium cermets having increased ductility and $UO_2$ loadings of greater than 70 volume percent $UO_2$ comprising:
   (a) applying a uniform wax coating to the surface of $UO_2$ spheres, said spheres containing oxygen in excess of the stoichiometric amount of oxygen, the $UO_2$ spheres having a density ranging from about 55 percent to about 74 percent of theoretical, and a diameter ranging from about 85 microns to about 250 microns;
   (b) applying a uniform coating of a mixture containing from about 19.5 to about 33.5 weight percent particulate columbium based on the total weight of the $UO_2$ spheres, the particulate columbium having oxygen contained therein as an impurity, and particulate carbon in an amount which is at least stoichiometrically equal to the amount of non-stoichiometric oxygen in the $UO_2$ spheres and the amount of oxygen contained in the particulate columbium, the particles of said columbium and said carbon having a particle size of less than 10 microns;
   (c) isostatically applying a pressure greater than 20 tons per square inch to the columbium and carbon coated spheres to form a compact of the spheres;
   (d) heating the compact in an inert atmosphere to a temperature of less than 900° C. to dewax the compact;
   (e) heating the compact at a temperature of 1700° C. for one hour to remove excess carbon; thereafter
   (f) heating the compact to a temperature ranging from between 2100° C. to 2300° C. in an inert atmosphere to sinter the compact.

2. The process of claim 1 wherein said uranium dioxide spheres have a theoretical density of 67 percent.

3. The process of claim 2 wherein the compact is heated to a temperature of 2200° C. in a helium atmosphere to sinter the compact.

References Cited

UNITED STATES PATENTS

| | | | |
|---|---|---|---|
| 1,566,793 | 12/1925 | Gero | 75—212 |
| 2,689,808 | 9/1954 | Clayton. | |
| 3,066,391 | 12/1962 | Vordahl | 75—212 |
| 3,088,892 | 5/1963 | Cain et al. | |
| 3,145,183 | 8/1964 | Fisher. | |
| 3,173,973 | 3/1965 | Brockway | 117—109 |
| 3,271,141 | 9/1966 | Kaveney et al. | 75—206 |
| 3,276,867 | 10/1966 | Brite et al. | 75—206 |
| 3,318,695 | 5/1967 | Goslee et al. | 75—212 |
| 3,344,211 | 9/1967 | Redding et al. | 117—109 X |

FOREIGN PATENTS

| | | |
|---|---|---|
| 1,031,678 | 6/1966 | Great Britain. |
| 1,054,116 | 1/1967 | Great Britain. |
| 640,634 | 5/1965 | Belgium. |
| 639,086 | 4/1964 | Belgium. |

BENJAMIN R. PADGETT, *Primary Examiner.*

ARTHUR J. STEINER, *Assistant Examiner.*

U.S. Cl. X.R.

11—109; 75—212; 117—71; 264—.5